Sept. 3, 1935.   L. KIRSCHBRAUN   2,013,349
BUILDING MATERIAL AND METHOD OF MAKING THE SAME
Filed May 25, 1932   2 Sheets-Sheet 1
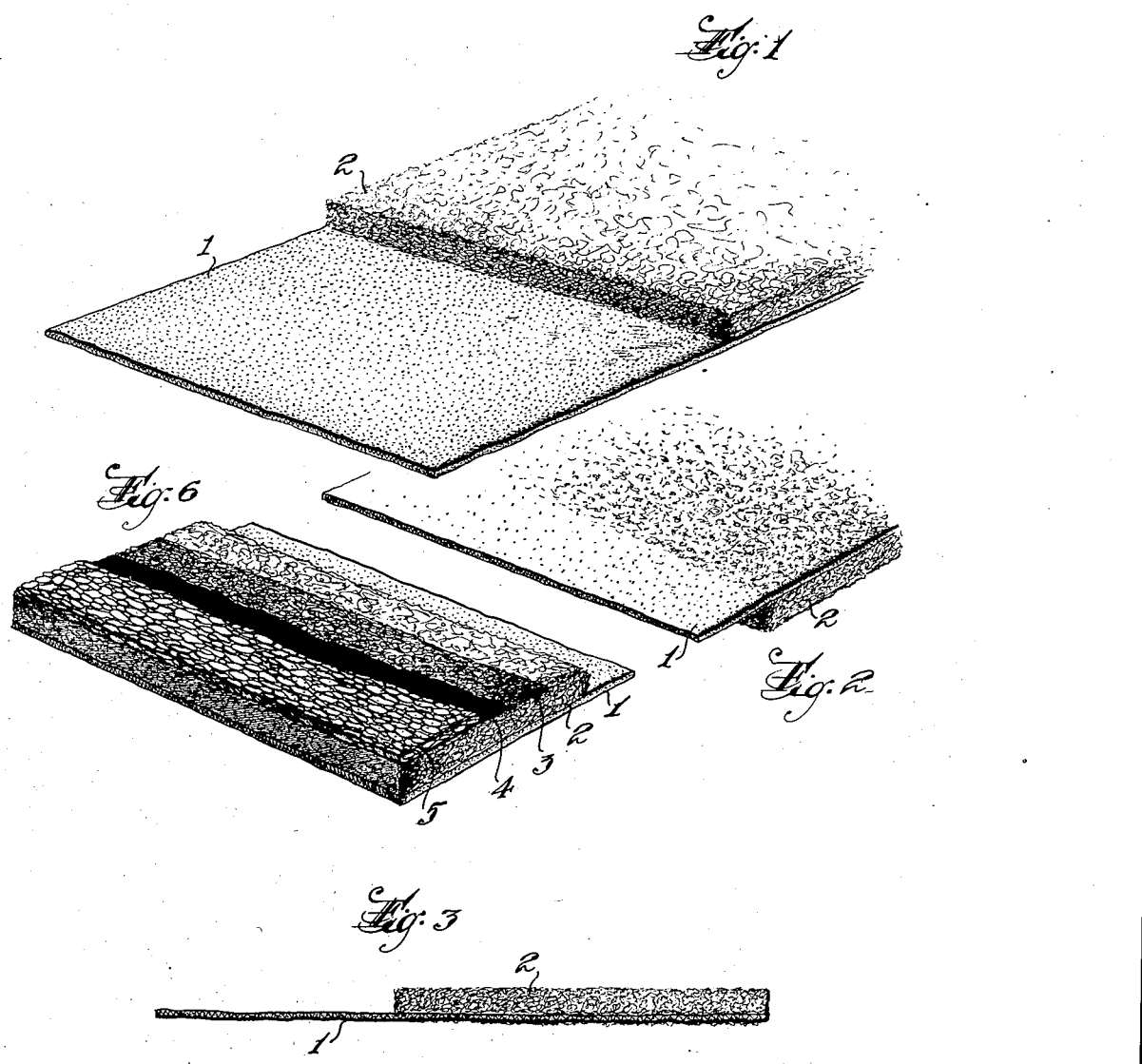
INVENTOR.
Lester Kirschbraun
BY Samuel Stearman
ATTORNEY Sept. 3, 1935.  L. KIRSCHBRAUN  2,013,349
BUILDING MATERIAL AND METHOD OF MAKING THE SAME
Filed May 25, 1932  2 Sheets-Sheet 2
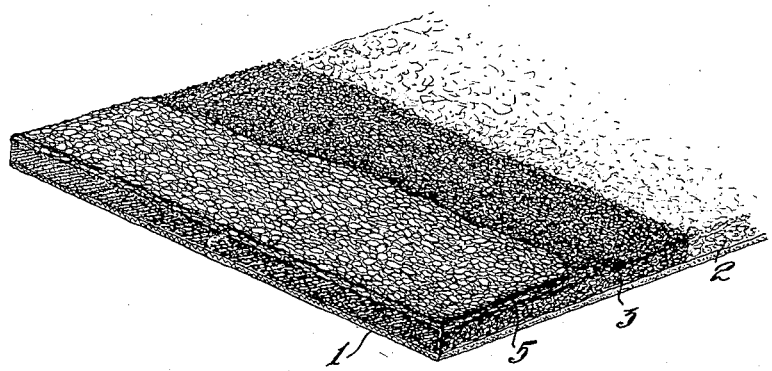
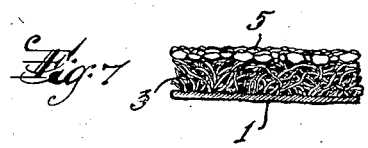
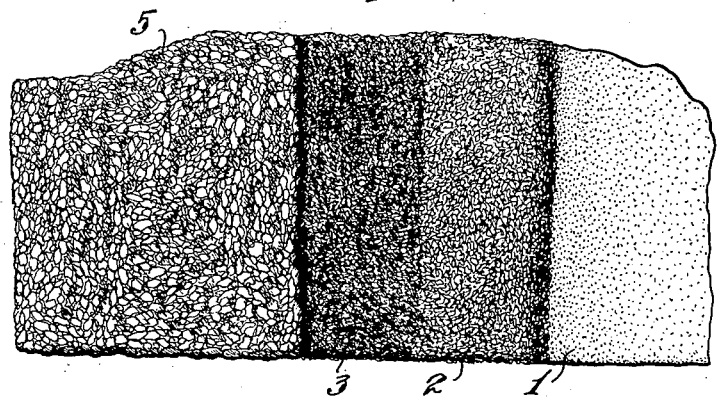
INVENTOR.
Lester Kirschbraun
BY Samuel Stearman
ATTORNEY Patented Sept. 3, 1935

2,013,349

UNITED STATES PATENT OFFICE 2,013,349

BUILDING MATERIAL AND METHOD OF MAKING THE SAME

Lester Kirschbraun, Leonia, N. J., assignor to The Patent and Licensing Corporation, Boston, Mass., a corporation of Massachusetts Application May 25, 1932, Serial No. 613,435

9 Claims. (Cl. 91—68)

This invention relates to building material and to a method of making the same and is more particularly concerned with the production of waterproof composition building material suitable for roofing, siding and other external coverings.

In the commercial art of manufacturing asphalt prepared roofing, use is made of a felted fibrous sheet as the base for the finished material. This felt base is customarily impregnated with a water resistant saturant, usually in the form of a low melting point asphalt. The thus saturated sheet is then provided on the face which is to form the outer or exposed face of the finished product, with a layer of weatherproof coating, usually in the form of a high melting point asphalt. In some instances also a similar coating though generally of lesser thickness is also applied to the opposite face of the sheet. The coated face or faces are then surfaced with comminuted mineral matter which is caused to become partially embedded in the coating under pressure suitably applied. The mineral matter for the first named or outer face, which is to become exposed in use generally comprises crushed slate, slag or equivalent mineral surfacing which acts as a masking layer for the coating to protect it from the weathering effects of the sun and serves also to furnish the desired ornamental appearance. Where the opposite face is also coated, this coating layer is usually surfaced with fine mica, or similar pulverulent material.

The sheet as thus made is marketed in the form of rolls or it is cut by suitable machinery into shingles or shingle strips of various shapes and sizes.

The felted fibrous base sheets from which this class of material is commercially manufactured, is produced on ordinary paper making machinery by felting a pulp of rag, wool, asbestos or similar fibres. Within the limits of satisfactory and economical operation of these felt making machines there is imposed an upper limit of thickness of the felted sheet of about .100 inches. In consequence of the limited thicknesses in which these felt base sheets can be economically produced, the usual commercial form of asphaltic roofing prepared therefrom suffers the objection of lacking a thickness which is highly desirable from an architectural point of view. It will be appreciated that the thickness of the base is not greatly increased by the superposed coating or coatings and layers of mineral surfacing. Even with the heavier grades of felt known in the trade as Giant felts, the maximum thickness of finished roofing that can be attained in commercial manufacture does not exceed .135 inches.

Moreover, while the felt base sheets are more or less bibulous in their nature and do absorb considerable saturant or impregnating substance, yet there is a limit to the amount of such saturant or impregnating substance that can be absorbed by the base. This usually varies from 170 to 200% by weight of the fibrous felt. Consequently the cost of the saturated felt base per unit of weight is represented in the main by the cost of the felt base itself and this is by far the more costly of the two elements.

Furthermore, the amount of saturant that can be satisfactorily incorporated in such a sheet is limited not only by the nature of the fibrous base itself, its porosity, but also by the penetrability of the impregnating substance. The asphalt that is normally used for this purpose varies in its characteristics from such as has a melting point of 140° F. to a melting point of 160° F. with penetration varying from 30 to 40. While it is possible to impregnate the ordinary roofing felt with asphalt of this general character to the extent of even as high as 200% by weight of the asphalt still this saturant does not greatly increase the rigidity of the felt base and the products made in this way are at all events notoriously flexible or pliable, and this flexibility of the saturated base is only slightly relieved by the coating of high melting point asphalt and the layer of mineral surfacing.

Altogether it has not been possible heretofore to produce an asphaltic composition roofing from a fibrous base, of a thickness or rigidity, comparable to those of wood shingles or slate tiles. At least it has not been possible to do so in commercial practice within the limits of reasonable cost. Attempts have been made to produce a product of this kind with the usual form of felt base material by laminating several layers of the felt base and/or by superposing successive layers of coating and surfacing material, at least on the areas which will be exposed to the weather in use. These expedients however, are obviously costly and in most instances the additional thickness thereby attained has not resulted in the production of a product of this general nature having the desired degree of thickness or rigidity.

The principal object of my invention is to provide a form of composition building material from a fibrous base of comparatively great thickness and which by suitable treatment can be converted into building elements such as roofing or siding shingles and the like possessing the desired thickness and rigidity, at a reasonable cost.

I have found that this desirable object, as well as a number of other advantages incident thereto, which will be pointed out hereinafter, may be attained by employing as the base, a thick loosely matted bat of fibres. In order to facilitate the handling of this bat during the treatment thereof in accordance with my invention, it is preferably reenforced by uniting thereto a reenforcing facing web which may comprise a sheet of paper or thin felt preferably saturated with asphalt, or other cheap fabric or web material, the bat being anchored to the facing web in any suitable manner as for example by stretching and sewing the same thereto; or by adhesively uniting the bat to the reenforcing web with asphalt or other adhesive; or by a needle-punching operation somewhat similar to that described in the patent to Robertson, No. 1,815,586.

My invention will be more fully understood from the following description in conjunction with the accompanying drawings of which:

Figure 1 is a perspective view showing the base used for producing material in accordance with my invention;

Figure 2 is a perspective view similar to Figure 1 but reversed;

Figure 3 is a cross sectional view of the base shown in Figures 1 and 2;

Figure 4 is a perspective view illustrating the several steps in the production of the material in accordance with my invention;

Figure 5 is a fragmentary plan view similar to Figure 4;

Figure 6 is a view similar to Figure 4 showing an additional step in the preparation of the material;

Figure 7 is a cross-sectional view of the finished material shown in Figure 4.

Referring to the drawings, the numeral 1 indicates a sheet of cheap thin felt to which a bat of fibrous material 2 has been anchored by needle punching the fibres into the sheet of saturated felt. The bat is preferably composed of jute fibres but may be composed of any other suitable fibres such as hemp, wool and the like. The bat 2, is prepared and applied to the fibrous sheet 1 in the manner substantially like that disclosed in the patent to Robertson et al. referred to above. The bat produced according to this patent is a loosely felted mat of dry laid fibres. Instead of needle-punching the bat into the fibrous sheet, the bat may be anchored to the sheet adhesively by means of asphalt or any other suitable adhesive material, or the bat may be anchored to the sheet by stitching and sewing it thereto. The bat 2 is a loosely felted bibulous layer capable of taking up a large amount of saturant. After the bat has been anchored to the felted sheet 1, this material is subjected to a saturating operation in any suitable manner but the sheet is preferably supported between a pair of wire screens as it passes through the saturating operation in order to prevent the sheet from rupturing.

After the base has been saturated it may be coated with molten asphalt preferably of higher point than that used for saturation, or asphalt emulsion and then surfaced with wear resisting material such as crushed slate, slag or the like and then cut into elements of suitable size and shape.

Due to the loosely matted and highly porous nature of the fibrous bat, the base is capable of taking up an abnormally large amount of saturant in relation to the weight of the fibre in the bat. Furthermore, the porous nature of the bat renders it possible to impregnate readily a bat which is exceedingly thick, as compared with fibrous felt sheets ordinarily used in the production of asphaltic roofing and the like. Thus, it is possible to saturate a bat of this nature of a thickness approximating 3/4 of an inch whereas fibrous felt as ordinarily used cannot in the first place be commercially manufactured in thicknesses nearly as great as that and secondly, these felts in thicknesses exceeding .100 inches can be satisfactorily and economically impregnated only with great difficulty. Still further, the nature of the bat employed in accordance with this invention makes it possible to saturate the same with asphalt having a substantially higher melting point than that which is feasible when saturating the usual felt used as a base for roofing material. Thus, whereas the saturant ordinarily employed, as above stated, varies from 140 to 160° F. melting point, the fibrous bat employed in accordance with my invention may without difficulty, be saturated with asphalt having a melting point as high as 220° F. Ordinary roofing felts on the other hand cannot except under great difficulty be satisfactorily impregnated with such hard saturants or even saturants having a melting point in excess of 160 to 170° F. The harder asphalts, which thus may be used to impregnate the fibrous bat of my invention, not only substantially increase the rigidity of the base but also by virtue of film of increased thickness about the fibres, enhances the weathering and wearing properties thereof. Accordingly in carrying out my invention the saturant may consist of molten asphalt having a melting point of 220° F.—and preferably the saturant for the bat has a lower melting point ranging from 170 to 220° F. and a sufficiently low penetration. Thus I have used a mixture of asphalt having a melting point of 220° F. with asphalt having a melting point of 150° F. in the ratio of one part of the former to from one to three parts of the latter, the resultant mix having a melting point of 170° to 197° F. and penetration range at 77° F. of from 5 to 20. The use of high melting point saturant avoids bleeding or exuding of the asphalt at elevated solar temperatures and prevents the material from becoming limp and flabby on the roof.

I have above referred to the abnormally large amount of saturant in relation to the weight of the fibre, that may be incorporated in the bat employed in accordance herewith. In terms of actual figures, this may vary from 500 to 2000% by weight of saturant based on the weight of the fibre in the bat. The advantage of this factor alone will be at once apparent to those skilled in the art, and will be fully appreciated from consideration of the fact that in saturating the ordinary roofing felt, incorporation of as much as 200% by weight of saturant, calculated on the weight of the felt, represents the maximum degree of saturation. To further illustrate the significance of this factor in respect of the cost of the saturated base, it may be stated that an ordinary roofing felt of the heavier grade known as giant felt and weighing approximately 16 pounds per 100 square feet, may be saturated with asphalt of a melting point of approximately 150° F. to the extent of 195% by weight or 30.5 pounds of the saturant. Of the total weight of the saturated felt approximately 1/3 is represented by the fibre. On the other hand 100 square feet of a bat, having a thickness of about 3/32", made from jute fibre employed in accordance with the invention weighs approximately 7.6 pounds, and this bat can readily be saturated with an asphalt or an asphalt mixture of a melting point of 170° F. to the extent of 114 pounds per 100 square feet. Of the total 120.6 pounds of this saturated bat, the fibre constitutes only approximately 6.3% and since the fibre is the more expensive of the two items, the saving in cost that can be effected in carrying out my invention will be clearly evident. Even where the bat is united to a reenforcing membrane or facing sheet of paper or felt, as herein described, the additional cost thereby incurred still keeps the cost entirely within reasonable commercial bounds. Likewise, the additional cost that may be incurred from the increased quantities of saturant that can be incorporated in the bat is offset by the advantages accruing in the resultant product. Thus, for example, the impregnated bat, when cooled is substantially rigid and has a thickness approximately the same as or only slightly less than the bat before saturating. For example, the bat before saturating may have a thickness from 3/32 to 5/8 of an inch and after saturation the thickness may range from 1/8 to 9/16 of an inch. The finished sheet after it has been coated and surfaced will range from 1/4 to 5/8 of an inch in thickness, more or less. Consequently, since the shingles or other units cut from the sheet, are so measurably thicker than shingles made from even the heavier grades of the ordinary roofing felt, a greater portion of each shingle may be exposed than is possible with safety in the case of ordinary felt base roofing. The cost based on the amount of material necessary to cover a given area is therefore not substantially greater than the cost of ordinary shingle elements. At the same time, the shingles made as herein described are at least two to three times the thickness of shingles made on Giant weight felt and thus lend to a roof, laid therewith, the much desired features of texture and do away with the thin and unsubstantial appearance characterizing the ordinary felt base shingles. The finished material has the characteristics of a fibrated asphalt rather than of a saturated felt and hence its wear-weathering qualities are superior to ordinary felt base shingles. Shingles or shingle strips cut from this material, being substantially rigid, are therefore easy to apply and are not subject to tearing and other damage during handling and manipulation; nor will they blow up in a high wind. While I speak of the shingles as being rigid in comparison with ordinary felt base shingles, as in fact they are, it will be understood of course, that they are readily nail penetrable and may be fastened to the roof or other supporting structure by nails or other devices in much the same way as ordinary felt shingles.

I claim as my invention:

1. A construction material comprising a loosely felted fibrous base composed of dry laid fibres saturated with at least 500% by weight of a normally solid bituminous waterproof substance.

2. A construction material comprising a loosely felted fibrous base composed of dry laid fibres saturated with at least 500% by weight of normal solid bitumen.

3. A construction material comprising a loosely felted fibrous base composed of dry laid fibres saturated with at least 500% by weight of asphalt having a melting point of at least 170° F.

4. A building material comprising a loosely felted fibrous base composed of dry laid fibres having substantially all the voids therein filled with asphalt having a melting point of at least 170° F.

5. Building material comprising a loosely felted fibrous base composed of dry laid fibres having a thickness of approximately 3/32 of an inch and weighing approximately 7.6 pounds per 100 square feet, said base being saturated with normally solid bitumen.

6. A building material comprising a loosely felted fibrous base composed of dry laid fibres having a thickness in excess of 1/16 of an inch and weighing less than 8 pounds per 100 square feet, said base being saturated with normally solid bitumen.

7. Building material comprising a loosely felted fibrous base composed of dry laid fibres saturated with from 5–20 times its weight of asphalt having a melting point of from 175 to 220° F.

8. Building material comprising a loosely felted fibrous base composed of dry laid fibres varying from 3/32 to 5/8 of an inch in thickness, saturated with from 5–20 times its weight of asphalt having a melting point of from 170° to 220° F.

9. Building material comprising a loosely felted fibrous base composed of dry laid fibres having a thickness of approximately 3/32 of an inch and weighing approximately 7.6 pounds per 100 square feet, said base being saturated with from 5–20 times its weight of asphalt having a melting point between 170° and 220° F.

LESTER KIRSCHBRAUN.